(12) United States Patent
Katchmart

(10) Patent No.: US 8,462,454 B1
(45) Date of Patent: *Jun. 11, 2013

(54) NULL SERVO DEMODULATION FOR SHORT SERVO WEDGE IN DISK STORAGE SYSTEMS

(71) Applicant: Marvell International Ltd., Hamilton (BM)

(72) Inventor: Supaket Katchmart, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/628,913

(22) Filed: Sep. 27, 2012

Related U.S. Application Data

(63) Continuation of application No. 12/897,210, filed on Oct. 4, 2010, now Pat. No. 8,295,002.

(60) Provisional application No. 61/355,036, filed on Jun. 15, 2010, provisional application No. 61/350,789, filed on Jun. 2, 2010, provisional application No. 61/250,818, filed on Oct. 12, 2009.

(51) Int. Cl.
*G11B 5/09* (2006.01)
*G11B 5/596* (2006.01)

(52) U.S. Cl.
USPC ............................. 360/48; 360/77.08

(58) Field of Classification Search
None
See application file for complete search history.

(56) References Cited

U.S. PATENT DOCUMENTS

| | | | |
|---|---|---|---|
| 6,243,224 B1 | 6/2001 | Sacks et al. | |
| 7,027,257 B1 | 4/2006 | Kupferman | |
| 7,046,465 B1 | 5/2006 | Kupferman | |
| 2002/0191318 A1 | 12/2002 | Satoh | |

OTHER PUBLICATIONS

Volder, "The CORDIC Trigonometric Computing Technique," IRE Transactions on Electronic Computers, Sep. 1959, pp. 226-230.
Smite, The Scientist and Engineer's Guide to Digital Signal Processing, California Technical Pub / www.dspguide.com, Chapter 8, The Discrete Fourier Transform, 1997, see especially pp. 157-164.
Knowledge Tek, "Disk Drive Servo," Knowledge Tek, Inc., Westminster, Colorado, 2004, 299 pp.
Zhang et al., "Evaluation of Servo Patterns for Perpendicular Recording," Trans. Asia-Pacific Magnetic Recording Conference, Nov. 29, 2006-Dec. 1, 2006, 2 pp.
http://en.wikipedia.org/wiki/CORDIC, May 9, 2010, pp. 1-8.
http://en.wikipedia.org/wiki/Atan2, May 25, 2010, pp. 1-7.

*Primary Examiner* — Regina N Holder

(57) ABSTRACT

In a disk storage system, the disk may include a full null servo position error signal ("PES") wedge, followed by a data wedge, and then a short null servo PES wedge. To improve the accuracy with which information read from the short null servo PES wedge can be used to help keep the read head centered over the information track being read, the short null servo PES wedge may include a calibration field. Information read from the calibration field can be used to compensate the subsequently read PES information in the short wedge for possible sampling phase error that may have accumulated since the full null servo PES wedge was read. This type of short null servo PES wedge also has other possible uses.

20 Claims, 13 Drawing Sheets

$$x[i] = \sin\left(2\pi \frac{i}{m_{cf}} + \phi_{cf}\right)$$

Where i = Sample Index $m_{cf}$ = Number of Samples per Calibration Field Cycle $\phi_{cf}$ = Calibration Field Phase Offset

FIG. 5

$$S1_{cf} = ImX_{cf} = \sum_{i=0}^{N-1} x[i] \cos\left(2\pi \frac{i}{m_{cf}}\right)$$

$$S0_{cf} = ReX_{cf} = \sum_{i=0}^{N-1} x[i] \sin\left(2\pi \frac{i}{m_{cf}}\right)$$

$$M_{cf} = \sqrt{S1_{cf}^2 + S0_{cf}^2}$$

$$A_{cf} = \text{atan2}(S1_{cf}, S0_{cf})$$

FIG. 6

$$S1_n = M_n * \sin(A_n + \delta)$$
$$S0_n = M_n * \cos(A_n + \delta)$$

FIG. 7

$$S0_{cf} = M_{cf} * \cos(\delta)$$

FIG. 8

$$M_n * \cos(A_n)$$

FIG. 9

$$SO_{cf} = M_{cf} * \cos(\delta)$$

$$\cos(\delta) = \frac{SO_{cf}}{M_{cf}}$$

$$SO_n = M_n * \cos(A_n + \delta)$$

$$= M_n * \cos(A_n)\cos(\delta) \quad \text{when } A_n = 0 \text{ or } \pi$$

$$ReX_n = M_n * \cos(A_n)$$

$$= \frac{SO_n}{SO_{cf}} * M_{cf}$$

FIG. 10

If $(SO_n / SO_{cf} < 0)$ $\cos(A_n) = -1$

Else $\cos(A_n) = 1$

FIG. 11

If $(SO_n / SO_{cf} < 0)$ $ReX_n = -M_n$

Else $ReX_n = M_n$

FIG. 12

If (abs(S0$_{cf}$) > abs(S1$_{cf}$))
    If (S0$_n$ / S0$_{cf}$ < 0)
        ReX$_n$ = - M$_n$
    Else
        ReX$_n$ = M$_n$
Else
    If (S1$_n$ / S1$_{cf}$ < 0)
        ReX$_n$ = - M$_n$
    Else
        ReX$_n$ = M$_n$

FIG. 13

$$CA_n = A_n - \frac{m}{m_{cf}} (A_{cf} - \phi_{cf})$$

If (CA$_n$ ≃ 0)
        ReX$_n$ = M$_n$
Else
    If (CA$_n$ ≃ π)
        ReX$_n$ = -M$_n$
    Else
        Error

FIG. 14

$$M = \sqrt{S1^2 + S0^2}$$
$$A = \text{atan2}(S1, S0)$$

FIG. 17

$$C_{cf} = \frac{1}{2^m} \pm \frac{1}{2^n}$$

FIG. 18

If $(-\frac{\pi}{2} \leq (C_{cf} \times A_{cf}) \leq \frac{\pi}{2})$
$\quad\quad ReX_n = M_n$
Else
$\quad\quad ReX_n = -M_n$

FIG. 19

NULL SERVO DEMODULATION FOR SHORT SERVO WEDGE IN DISK STORAGE SYSTEMS

CROSS REFERENCE TO RELATED APPLICATIONS

This is a continuation of commonly-assigned U.S. patent application Ser. No. 12/897,210, filed Oct. 4, 2010, now U.S. Pat. No. 8,295,002, which claims the benefit of, and was commonly-assigned U.S. Provisional Patent Applications Nos. 61/250,818, 61/350,789, and 61/355,036, filed respectively on Oct. 12, 2009, Jun. 2, 2010, and Jun. 15, 2010, all of which are hereby incorporated by reference herein in their entireties.

BACKGROUND

This disclosure relates to disk storage systems. Disk storage systems typically contain a rotating disk on which information (usually in the form of digital data) can be recorded (written) and/or from which recorded information can be retrieved (read).

In systems of the type mentioned above, the information is generally recorded in a plurality of concentric circular paths or tracks on the disk. The head that writes data to and/or reads data from the disk must follow particular ones of these tracks in order to write data to or read data from the disk. (To simplify the further discussion herein, it will generally be assumed that the disk is already recorded with information and that the above-mentioned head is a read head via which information is read from the disk. It will be understood, however, that this disclosure is also applicable to writing information to a disk, and that the head can include write as well as read capabilities. Another assumption that will generally be made to simplify the following discussion is that the disk is a magnetic disk that records information based on how various regions (areas) of the disk are magnetically polarized. Again, however, it will be understood that the disk can alternatively record information in other ways such as by optically detectable means.)

In order to read desired information from the disk, the read head must be properly located over the track containing that desired information. To facilitate such read head positioning, the disk is also recorded with several radially extending and angularly spaced wedges of information that contain track-identifying information, and also information that can be used to control the read-head-positioning mechanism to optimally center the read head over the desired track, especially in the direction that is radial of the disk.

To save space on the disk for user data, only some of the above-mentioned wedges may be so-called full servo wedges. A full servo wedge includes a full complement of information such as track and sector identifying information for each track, as well as so-called servo information for helping the head-control circuitry to radially position the head over the desired track. As a space-saving measure, such full servo wedges may be angularly interspersed (or inter-digitated) with so-called short servo wedges. A short servo wedge may contain only servo information for helping to ensure that the read head remains radially centered over the track it is already currently reading data from.

This disclosure relates to improving the performance of disk storage systems that employ short servo wedges.

FIG. 1 shows a representative portion of a known arrangement 100 of information recorded on a memory disk 20 in a disk storage system. Only a representative portion of disk 20 is shown in FIG. 1. Also, the actual, somewhat arcuate shape of recorded information arrangement 100 has been made straight (i.e., from left to right across FIG. 1) to simplify the depiction and the following discussion. Directions that are radial of disk 20 are vertical as viewed in FIG. 1. Planar rotation of disk 20 causes information 100 to move from right to left (which is the circumferential or angular direction of disk 20). Read head 10 (which is part of the disk storage system containing disk 20) is able to move in a direction that is radial of disk 20 (i.e., up or down in FIG. 1), but can be assumed for present purposes not to move in directions that are circumferential or angular of disk 20. A servo mechanism (not shown in FIG. 1) controls the radial position of read head 10, based at least in part on information read from disk 20. The recorded information arrangement 100 shown in FIG. 1 has the so-called null servo position error signal format. (Position error signal is frequently abbreviated PES.) Other formats for information on disks in disk storage systems are also known, but the present disclosure is especially useful in connection with the null servo PES format.

FIG. 1 shows portions of three, representative, radially adjacent, recorded information tracks on disk 20. These tracks are arbitrarily referenced data tracks R, S, and T, respectively. Note again that the representative portions of tracks R, S, and T shown in FIG. 1 and other FIGS. throughout this disclosure would in reality actually be somewhat arcuate (e.g., concave up or concave down as viewed in FIG. 1) because the track portions shown are radially adjacent segments of longer, concentric circular tracks on the disk. FIG. 1 shows read head 10 positioned over track S and therefore reading information along the axis indicated by arrow 12 as that information moves from right to left under read head 10. It will be appreciated that arrow 12 in FIG. 1 does not indicate motion of read head 10, but rather the direction of information reading as rotating disk 20 travels under read head 10. The dimension of the effective portion of read head 10 that is radial of disk 20 is preferably no greater than the radial dimension (width) of a track, so that when read head 10 is properly centered over a track, read head 10 is only influenced by the information recorded in that track and not by information recorded in the radially adjacent tracks.

FIG. 1 also shows the information in a representative portion of one full null servo PES wedge 110 and a representative portion of one short null servo PES wedge 300. Data tracks R, S, and T are in a data wedge 200 between full null servo PES wedge 110 and short null servo PES wedge 300. This pattern may continue in a closed loop series all the way around disk 20. For example, this closed loop series may comprise a first full null servo PES wedge, a first data wedge, a first short null servo PES wedge, a second data wedge, a second full null servo PES wedge, a third data wedge, a second short null servo PES wedge, a fourth data wedge, and then back to the first full null servo PES wedge. Alternatively, a pattern like the one just described may be longer before it gets back to the first full null servo PES wedge. As still another alternative, a pattern like the one described may have more than one short null servo PES wedge, each of which is followed by a data wedge, before the next full null servo PES wedge is encountered.

FIG. 1 shows that each full null servo PES wedge 110 may include (in the order read by read head 10) a preamble area 120, a servo sync mark ("SSM") area 130, a track/sector identification ("ID") area 140, a PES area 150, and a repeatable run-out ("RRO") area 160. Preamble area 120 and PES area 150 are of special importance for present purposes and will be described in more detail below. FIG. 1 further shows that each short null servo PES wedge 300 includes a PES area 150' similar to PES area 150.

Preamble area 120 may include bands of disk 20 material having alternating magnetic polarity that extend radially of the disk, continuously across all of the tracks on the disk. FIG. 2 includes a depiction of a representative portion of such a preamble area 120. Thus, as shown in FIG. 2, each band 122+ extends radially across all of tracks R, S, T, etc., and has "positive" magnetic polarity. Interspersed or inter-digitated between bands 122+ are bands 122−, which are similar to bands 122+ but which have magnetic polarity (e.g., "negative" magnetic polarity) that is opposite to the magnetic polarity of bands 122+. As read head 10 passes over the successive bands 122 of preamble area 120, the output signal of read head 10 oscillates in response to the different polarities of the successive bands 122. The frequency and phase of a sampling clock signal that is used for subsequently sampling the read head 10 output signal (as will later be described in this specification) are locked to the frequency and phase of the read head 10 output signal as read head 10 passes over preamble area 120. Note that because bands 122 are radially continuous across all of tracks R, S, T, etc., this frequency and phase locking is equally effective regardless of how well read head 10 is currently aligned in the radial direction with any particular track R, S, T, etc.

Servo sync mark ("SSM") area 130 contains a special pattern of recorded information that the circuitry receiving the output signal of read head 10 can recognize; and that when recognized, tells the circuitry when to expect read head 10 to be subsequently reading track/sector ID information 140, PES information 150, RRO information 160, data 200, etc.

Once the frequency and phase of the above-mentioned sampling clock signal have been locked to the preamble area 120 information, the PES area 150 that is part of the same full null servo PES wedge 110 can be used to provide information for ensuring that read head 10 is centered (in the radial direction) over a particular track like any of tracks R, S, T, etc. FIG. 1 shows that in PES area 150 a PES A+ subarea is aligned with track R, a PES A− subarea is aligned with track S, and a PES A+ subarea is aligned with track T. This pattern of alternating PES A+ and PES A− subareas continues for tracks above and below representative tracks R, S, and T.

Downstream from the PES A area, PES area 150 includes a PES B+ subarea that straddles (i.e., is equally distributed across) radially adjacent, radial halves of each of tracks R and S. A PES B− subarea similarly straddles tracks S and T. Another PES B+ subarea similarly straddles track T and the next track down. This pattern of alternating PES B+ and PES B− subareas continues above and below what is representatively depicted in FIG. 1.

FIG. 2 also shows the pattern of information that may be recorded on the disk in PES area 150. For example, a PES A+ subarea may begin (on the left) with a band 152+ having positive magnetic polarity, followed by a band 152− of negative magnetic polarity, which is followed in turn by another band 152+ having positive magnetic polarity, and so on. On the other hand, a PES A− subarea may start (on the left) with a band 152− of negative magnetic polarity, followed by positive polarity band 152+, then a negative polarity band 152−, and so on. A PES B+ subarea may be similar to a PES A+ subarea, except, of course, that it exactly straddles two radially adjacent tracks. A PES B− subarea may be similar to a PES A− subarea, except that it exactly straddles two radially adjacent tracks.

If read head 10 is exactly centered (in the radial direction) over a track, the signal from read head 10 as it passes over the PES A region of full null servo PES wedge 110 will be an oscillating signal of maximum strength (amplitude) corresponding to either the PES A+ or the PES A− pattern, depending on whether the track being read is aligned with a PES A+ or a PES A− subarea. After passing over the PES A area, a read head 10 that is exactly centered over a track as mentioned in the preceding sentence will produce an output signal having essentially zero amplitude as it passes over the PES B area. This is so because in the PES B area, the read head 10 in this situation is always exactly straddling 152+ and 152− subareas. The effects of such exactly straddled subareas 152+ and 152− on read head 10 substantially cancel one another.

If instead of being radially centered over a track as read head 10 passes over the PES A and PES B areas, read head 10 is somewhat radially offset from the center of a track, the amplitude of the read head 10 output signal will be correspondingly diminished as it passes over the PES A area. This read head 10 output signal amplitude reduction will be due to some contribution from each of two radially adjacent PES A areas, one of which will be a PES A+ subarea and the other of which will be a PES A− subarea. The amount of this read head 10 output signal amplitude reduction can be used as a measure of how far from the center of a track read head 10 is.

Such a non-centered read head 10 will also have an output signal of non-zero amplitude as it continues over the PES B area of full null servo PES wedge 110. This non-zero amplitude will be due to the fact that read head 10 no longer exactly straddles radially adjacent PES B+ and PES B− subareas, but rather is being more strongly influenced by one or the other of such subareas. The phase of this non-zero amplitude read head 10 output signal (relative to the phase of the immediately preceding preamble area 120) can be used to indicate whether read head 10 needs to be moved radially in or radially out in order to become radially centered over the track it is trying to read. For example, the phase of the above-mentioned non-zero amplitude signal (relative to the preamble area 120 phase) may be 0° if a PES B+ subarea is the predominant influence on read head 10. Alternatively, the phase of the above-mentioned non-zero amplitude signal (relative to the preamble area 120 phase) may be 180° if a PES B− subarea is the predominant influence on read head 10. Of course, these are only examples, and the phase relationship between the preamble and PES B areas depends on such factors as the angular spacing between these areas, the patterns in which information is recorded in these areas, etc.

Thus, to briefly summarize the foregoing discussion, the information gathered from a read head 10 passing over a full null servo PES wedge 110 can be used to determine whether read head 10 is properly centered over the track it is trying to read (PES A area read head 10 output signal at full amplitude and PES B area read head 10 output signal at or near zero amplitude), or is in need of some radial adjustment in order to become radially centered over the track. In the latter case (i.e., radial adjustment of read head 10 needed), the amount of that radial adjustment can be derived from the amount by which the PES A read head 10 output signal amplitude is reduced from full amplitude; and the direction of the needed radial adjustment can be derived from the phase of the PES B output signal (relative to the phase of the immediately preceding preamble area 120).

The foregoing operations are highly effective within a full null servo PES wedge like 110. As mentioned earlier in this disclosure, however, to conserve space on a disk, short null servo PES wedges like 300 may be interspersed with full null servo PES wedges like 110. The recorded information in each known short null servo PES wedge 300 may be another instance 150' of what is shown at 150 in FIGS. 1 and 2. In particular, each known short null servo PES wedge 300 typically includes only PES A and PES B areas, and does not include other information such as is shown in areas 120, 130, 140, and 160 in FIG. 1 or in area 120 in FIG. 2. Because a short null servo PES wedge 300 is angularly relatively far from the preceding full null servo PES wedge 110, the phase information for the PES B area of a short null servo PES wedge 300 relative to the phase of the preamble area 120 of the preceding full null servo PES wedge 110 can be less reliable than the relative phase information for the preamble and PES B areas within a full null servo PES wedge like 110. Also, because of the relatively great angular distance between a full null servo PES wedge 110 and the next short null servo PES wedge 300, when read head 10 reaches the wedge 300, it can be radially off the center of the track it is trying to read by more than half the radial width of a track. Considerations such as these can make use of known recorded information arrangements such as are illustrated by FIG. 1 (i.e., recorded information arrangements 100 in which short null servo PES wedges like 300 are interspersed with full null servo PES wedges like 110) less reliable than would be desirable in dealing with information read from a short null servo PES wedge 300. The present disclosure substantially eliminates this problem.

The background description provided herein is for the purpose of generally presenting the context of the disclosure. Work of the inventor hereof, to the extent the work is described in this background section, as well as aspects of the description that may not otherwise qualify as prior art at the time of filing, are neither expressly nor impliedly admitted as prior art against the present disclosure.

SUMMARY

In accordance with certain possible aspects of the disclosure, a memory disk may include at least one full null servo position error signal ("PES") wedge on the memory disk; and at least one short null servo PES wedge on the memory disk, the short null servo PES wedge including a calibration field and a position error signal field.

A memory disk as summarized above may include a plurality of concentric information tracks, and the calibration field may include a plurality of bands, each of which extends across the plurality of tracks radially of the memory disk, and each band having magnetic polarization that is opposite to magnetic polarization of others of said bands that are immediately adjacent to said each band.

A memory disk as initially summarized above may include a plurality of concentric information tracks, and the position error signal field may include first and second position error signal ("PES") areas, the first PES area having a plurality of first subareas, each of which is aligned with a respective one of the tracks, and the second PES area having a plurality of second subareas, each of which is not aligned with the tracks.

Certain other possible aspects of the disclosure relate to systems for reading information from a disk that is rotating relative to a read head. The information may have been previously recorded in a plurality of tracks that are radially adjacent to one another on the disk and that each extend in a direction that is circumferential of the disk. Such a system may include at least one full null servo position error signal ("PES") wedge recorded on the disk to extend in a radial direction across multiple ones of the tracks. The system may further include at least one short null servo PES wedge recorded on the disk to extend in a radial direction across said multiple ones of the tracks at a location that is angularly spaced from the full null servo PES wedge, the short null servo PES wedge including a calibration field and a position error signal field.

A system as summarized above may further include circuitry for using a first signal indicative of information read from the disk by the read head passing over the calibration field as a basis for processing a second signal indicative of information read from the disk by the read head passing over the position error field.

In a system as summarized above, the circuitry may include first further circuitry for determining a calibration field signal magnitude and a calibration field signal angle from the first signal, and position error field signal magnitudes and position error field signal angles from the second signal.

In a system as summarized above, the circuitry may further include second further circuitry for selectively modifying the position error field signal magnitudes based at least in part on the calibration field signal angle to produce third signals for use in controlling adjustment of a radial position of the read head relative to the disk.

In a system as summarized above the second further circuitry may use the calibration field signal angle to determine an algebraic sign for the position error field signal magnitudes and to thereby produce signed magnitude signals, the third signals for use in controlling adjustment of the radial position of the read head being based at least in part on the signed magnitude signals.

In a system as first summarized above, the calibration field may include a plurality of bands, each of which extends radially of the disk across said multiple ones of the tracks, each band having magnetic polarization that is opposite to magnetic polarization of bands that are immediately adjacent to said each band in directions that are circumferential of the disk.

In a system as first summarized above, the calibration field may have a frequency different than the position error signal field, and the system may further include circuitry for controlling flying height of the read head relative to the disk based at least in part on information read from the calibration field.

In a system as first summarized above, the short null servo wedge may be recorded at a predetermined angular spacing from the full null servo PES wedge. The system may then further include circuitry for determining an expected angular position of the calibration field based at least in part on the full null servo PES wedge; circuitry for detecting an actual angular position of the calibration field; and circuitry for using the expected angular position and the actual angular position to determine a frequency offset error.

Certain still other possible aspects of the disclosure relate to methods of reading information from a disk that is rotating relative to a read head, the information being previously recorded in a plurality of tracks that are radially adjacent to one another on the disk and that each extend in a direction that is circumferential of the disk. The disk has at least one full null servo position error signal ("PES") wedge recorded on the disk to extend in a radial direction across multiple ones of the tracks, and at least one short null servo PES wedge recorded on the disk to extend in a radial direction across said multiple ones of the tracks at a location that is angularly spaced from the full null servo PES wedge, the short null servo PES wedge including a calibration field and a position error signal field. The method may include reading the calibration field to produce a calibration field signal, reading the position error signal field to produce a position error field signal, and using information from the calibration field signal and the position error field signal to produce a signal for use in controlling adjustment of a radial position of the read head relative to the disk.

In a method as summarized above, the information from the position error field signal may be indicative of an amount by which the read head is radially displaced from the center of a track being read, and the using may include adjusting the information from the position error field signal based at least in part on information from the calibration field signal to compensate for phase error in the position error field signal.

In a method as summarized above, the using may further include periodically sampling each of the calibration field signal and the position error field signal to produce respective sets of calibration field signal samples and position error field signal samples, and performing a discrete Fourier transform on each of the sets of samples.

In a method as summarized above, the using may still further include converting results of each discrete Fourier transform to a magnitude value and an angle value.

In a method as summarized above, the using may yet further include combining an angle value from the discrete Fourier transform of a set of samples of the calibration field signal and an angle value from the discrete Fourier transform of a set of samples of the position error field signal to produce a calculated angle value.

In a method as summarized above the using may still further include using the calculated angle value to determine an algebraic sign for a magnitude value from the discrete Fourier transform of a set of samples of the position error field signal, said magnitude value from the discrete Fourier transform of a set of samples of the position error field signal being indicative of said amount by which the read head is radially displaced from the center of the track being read, and said algebraic sign being indicative of whether said amount is radially inward or radially outward of the disk.

In a method as first summarized above, the calibration field may have a frequency different than the position error signal field, and the method may further include controlling flying height of the read head relative to the disk based at least in part on information read from the calibration field.

In a method as first summarized above, the short null servo PES wedge may be recorded at a predetermined angular spacing from the full null servo PES wedge, and the method may further include determining an expected angular position of the calibration field based at least in part on the full null servo PES wedge, detecting an actual angular position of the calibration field, and using the expected angular position and the actual angular position to determine a frequency offset error.

Further features of the disclosure, its nature and various advantages will be more apparent from the accompanying drawings and the following detailed description.

BRIEF DESCRIPTION OF THE DRAWINGS

FIGS. 5-10 show some relationships that can be used in processing information read from a recorded information arrangement like that shown in FIGS. 3 and 4.

FIGS. 11-15 show some procedures that can be used in processing information read from a recorded information arrangement like that shown in FIGS. 3 and 4.

FIGS. 17 and 18 show some additional relationships that can be used in processing information read from a recorded information arrangement like that shown in FIGS. 3 and 4.

FIG. 19 shows another procedure that can be used in processing information read from a recorded information arrangement like that shown in FIGS. 3 and 4.

DETAILED DESCRIPTION

Figure 2:
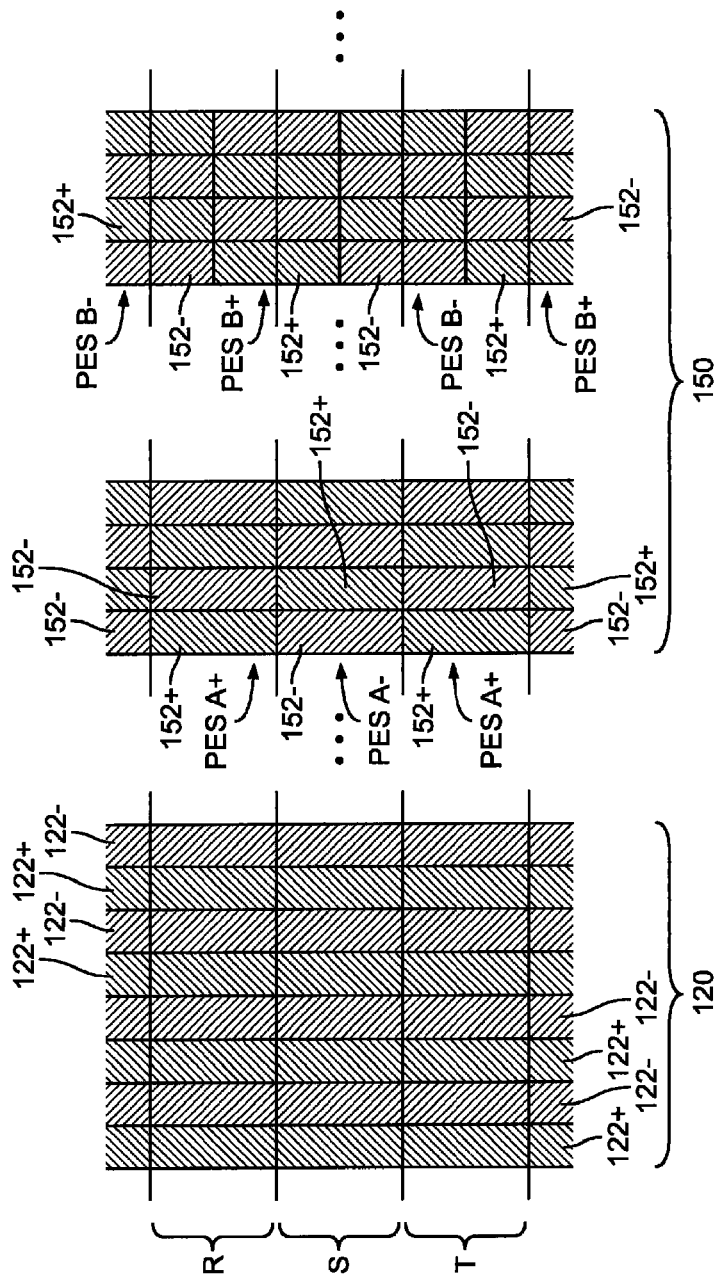
FIG. 2 is a more detailed, but still simplified diagram of representative portions of the FIG. 1 recorded information arrangement.
Figure 3:
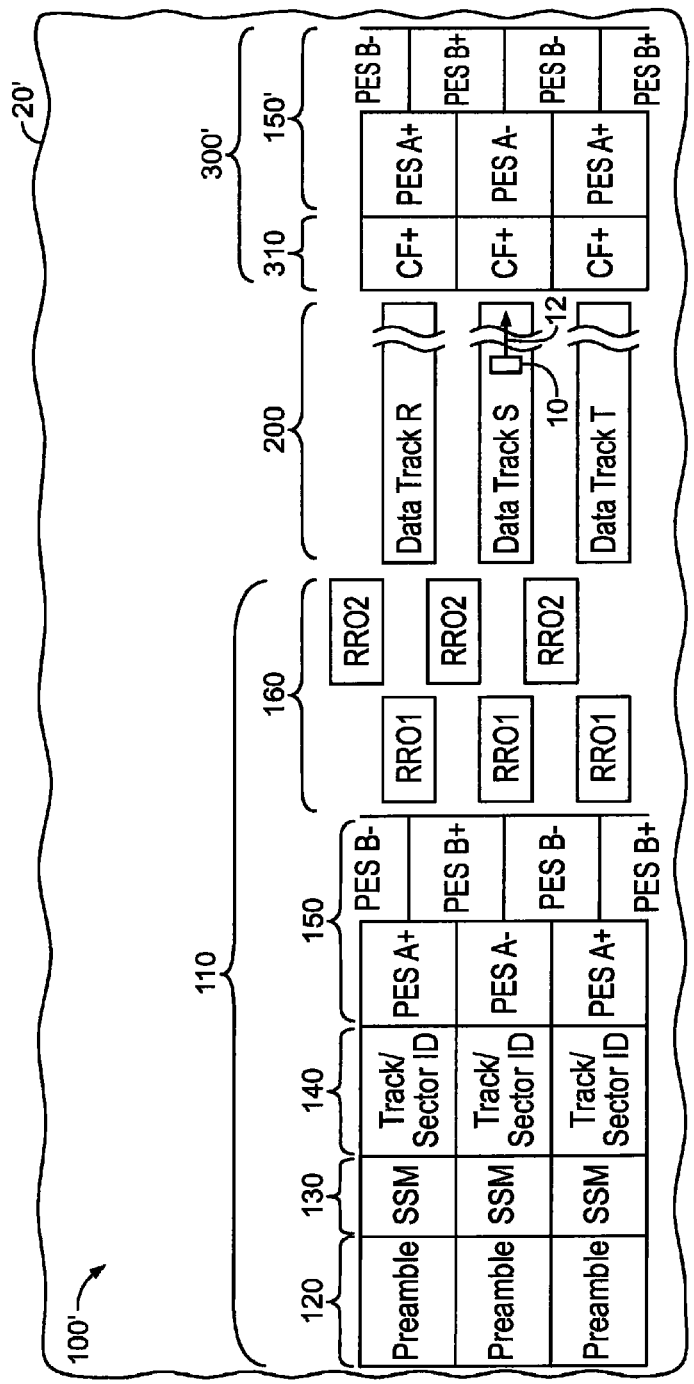
FIG. 3 is similar to FIG. 1, but shows an illustrative embodiment of a modified recorded information arrangement in accordance with certain possible aspects of this disclosure.

FIG. 3 shows an illustrative embodiment of a representative portion of a recorded information arrangement 100' that can be recorded on a memory disk 20' in a disk storage system in accordance with certain possible aspects of this disclosure. Except for employing a different recorded information arrangement 100', disk 20' may be the same as above-described disk 20. Recorded information arrangement 100' includes a full null servo PES wedge 110 like wedge 110 in FIGS. 1 and 2, a data wedge 200 like data wedge 200 in FIG. 1, and a short null servo PES wedge 300' that is modified (in accordance with this disclosure) as compared to the short null servo PES wedge 300 in FIG. 1. In particular, in addition to a PES area 150' (which can be the same as PES area 150' in FIG. 1), short null servo PES wedge 300' includes a calibration field ("CF") or area 310 that may immediately precede PES area 150' in the direction that disk 20' is read by read head 10. Note that although short null servo PES wedge 300' adds CF 310 to PES area 150', short null servo PES wedge 300' still does not include other areas characteristic of a full null servo PES wedge 110. In particular, short null servo PES wedge 300' may not include a preamble area 120, an SSM area 130, a track/sector ID area 140, or an RRO area 160.

Figure 4:
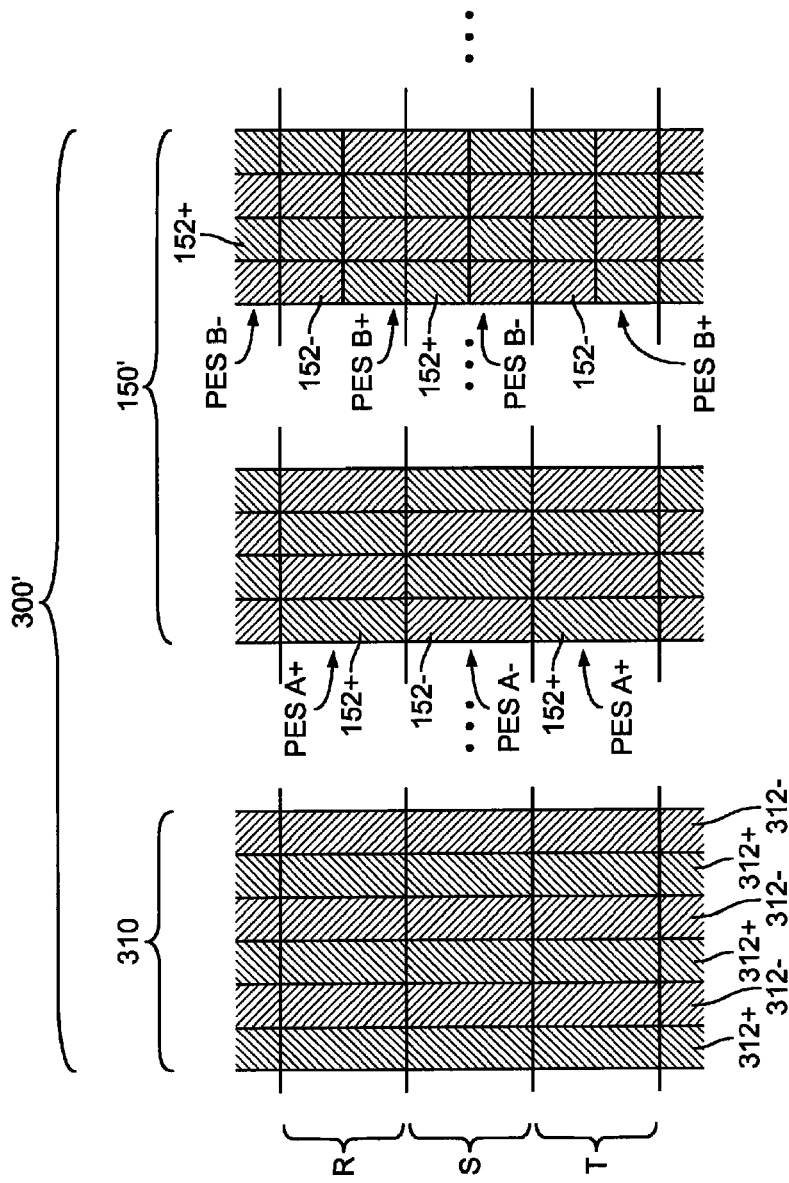
FIG. 4 is similar to FIG. 2, but shows an illustrative embodiment of representative portions of the FIG. 3 recorded information arrangement.

FIG. 4 shows an example of the information that may be recorded on a disk in a short null servo PES wedge 300' in accordance with certain possible aspects of this disclosure. Calibration field 310 may include a plurality of bands 312+ and 312− of disk 20' material, each of which bands 312 extends radially across all of the recorded information tracks on disk 20' (e.g., like recorded information tracks R, S, and T). Each band 312+ may be recorded with a first magnetic polarization (e.g., "positive" magnetic polarity or polarization); and each band 312− may be recorded with a second magnetic polarization (e.g., "negative" magnetic polarity or polarization), which is magnetically opposite to the first magnetic polarization. Bands 312+ and 312− alternate with one another in the direction that is circumferential of disk 20'.

Figure 1:
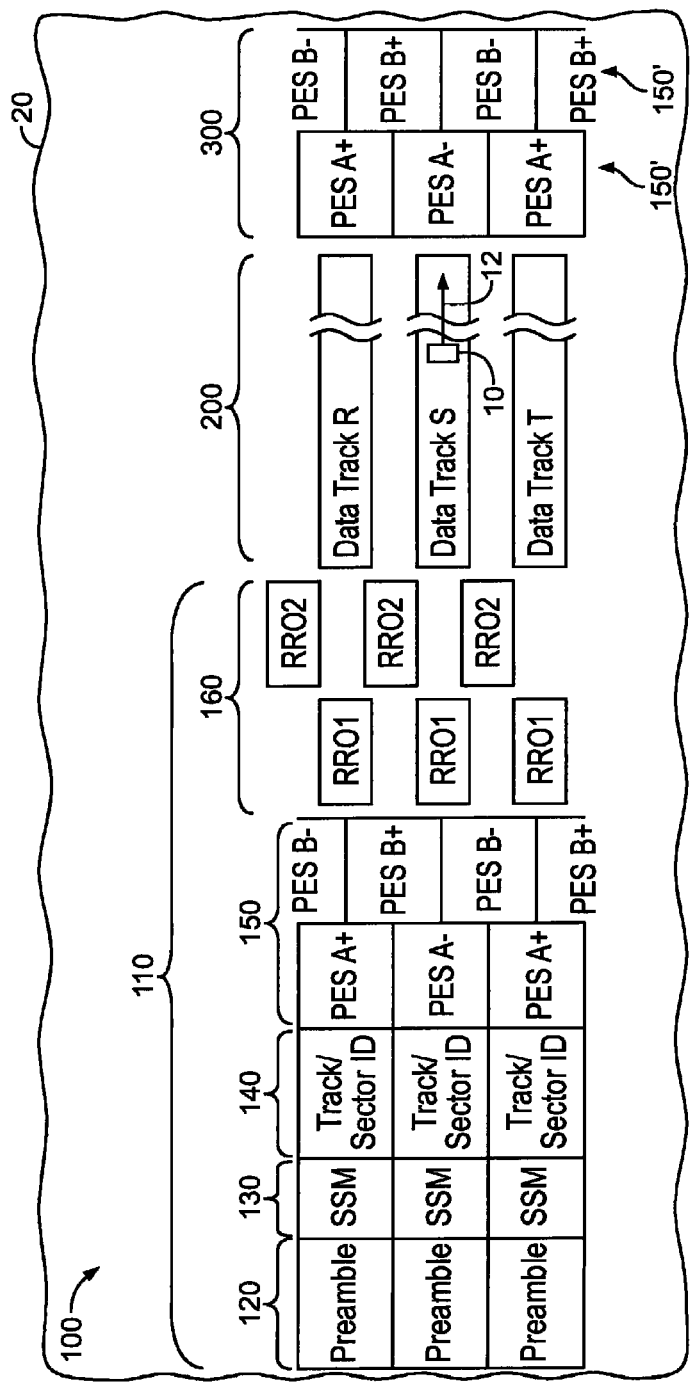
FIG. 1 is a simplified diagram (plan view) of a representative portion of a known arrangement of information recording on a memory disk.

As has been said, in one embodiment, PES area 150' in FIGS. 3 and 4 can be the same as PES area 150' in FIG. 1. Accordingly, PES area 150' in FIGS. 3 and 4 can be another instance of what is shown at 150 in any of FIGS. 1-3.

When read head 10 passes over calibration field 310, the output signal of read head 10 is an oscillating signal corresponding to the periodically reversing magnetic polarity detected by read head 10 as it passes over the calibration field. Because calibration field 310 is continuous (radially of disk 20') across all tracks, the output signal of read head 10 is not dependent on or affected by how read head 10 is radially positioned relative to any particular track. Accordingly, the output signal of read head 10 (as it passes over CF 310) is not affected by how read head 10 may have drifted off the center of the track currently being read as disk 20' rotates from when full null servo PES wedge 110 is under the read head to when short null servo PES wedge 300' is under the read head. However, small timing errors (e.g., how well the sampling clock frequency is synchronized with factors like disk 20' rotation speed, disk 20' angular position at which various information features are recorded on the disk, etc.) can accumulate over the angular distance between wedges 110 and 300' to cause sampling of the read head 10 output signal from wedge 300' to be different (e.g., as a result of differences in sampling phase), depending on the amount of such accumulated error. Note that CF 310' is not used to relock the sampling clock signal to the frequency and phase of CF 310'. The frequency and phase lock previously established during the reading of the preceding full null servo PES wedge 110 preamble 120 continues to be used throughout the reading of short null servo PES wedge 310'. As will be seen, this means that although CF 310' is added to short null servo PES wedge 300', CF 310' may not need to be as long (in the disk 20' angular direction) as preamble 110, and CF 310' does not need to be accompanied in short null servo PES wedge 300' by other information like SSM 130, track/sector ID 140, and RRO 160. Thus short null servo PES wedge 300' can remain relatively economical in terms of disk 20' area occupied. Only one relatively small CF 310' area is added to each short null servo PES wedge 300'.

The benefit of including CF 310' in short null servo wedge 300' is that it gives the system a new ability to effectively recalibrate the immediately following PES area 150' read head 10 output signal samples to compensate for any error or apparent error in the angular position on disk 20' of short null servo PES wedge 300' relative to the preceding full null servo PES wedge 110. CF 310' can therefore be used as described more fully below to get rid of the adverse effects of such angular position error (or apparent angular position error) and thereby greatly increase the accuracy of interpretation and use of the information read from PES area 150'.

The above-discussed benefits of including CF area 310 in short null servo PES wedge 300' are applicable both to disk storage systems that employ analog processing of the read head 10 output signal, and to disk storage systems that employ digital signal processing of the output signal of read head 10. See, for example, Sacks et al U.S. Pat. No. 6,243,224, which shows examples of both types of systems (e.g., synchronous analog demodulation in FIG. 6, and asynchronous, digital demodulation in FIG. 7). The further discussion below will relate mostly to illustrative embodiments employing digital signal processing of the read head 10 output signal. But again, it is noted that analog signal processing can be used instead if desired.

Assuming digital signal processing of the output signal of read head 10 as mentioned in the preceding paragraph, then calibration field ("CF") 310 can be modelled as shown in FIG. 5. A "calibration field cycle" in FIG. 5 is one instance of an adjacent pair of full bands 312+ and 312−. "Calibration field phase offset" is an equation-generalizing term that allows CF 310 to begin at any point (or phase angle) in a calibration field cycle that is normally thought of as extending from 0° to 360°. CF 310 can then be detected as shown in FIG. 6. The letters Im (e.g., as in the first relationship in FIG. 6) refer to a mathematically "imaginary" component. The letters Re (e.g., as in the second relationship in FIG. 6) refer to a mathematically "real" component. N is the number of samples in one calibration field or PES area. $M_{cf}$ is the detected magnitude or amplitude of CF 310. $A_{cf}$ is the detected phase angle of CF 310. The a tan 2 function in FIG. 6 is defined as follows: for any real arguments x and y, both not equal to zero, a tan 2(y,x) is the angle in radians between the positive x-axis of a plane and the point given by the coordinates (x,y) on the plane.

Calculation of the PES field 150' ReX term can then be as follows. This discussion assumes that CF 310 has the same frequency as PES field 150'. ("Frequency" in a context like this refers to the rate at which disk 20' magnetism alternates between positive and negative polarity as the relevant field 310 or 150' passes under read head 10. For example, narrower bands like 312 or 152 result in higher frequency oscillation of the read head 10 output signal. Wider bands like 312 or 152 result in lower frequency oscillation of the read head 10 output signal.) When a sampling phase error (or sampling phase offset) is present, the detected value of each read head 10 output signal burst from the PES A portion or the PES B portion of wedge 150' will be as shown in FIG. 7. Sampling phase error (or sampling phase offset) refers to what was earlier described as the error in read head 10 output signal sample timing that may accumulate from (1) the time that the sampling clock signal frequency and phase are locked to a full null servo PES wedge 110 preamble 120 to (2) the time when read head 10 is reading the subsequent short null servo wedge 300'. The variable δ is used (e.g., in FIG. 7) for this sampling phase error (or sampling phase offset). The subscript n in FIG. 7 and subsequent FIGS. is a generalized index parameter whose value depends on the particular information field being referred to at any particular time or in any particular context. For example, n may have one value (e.g., "a") for specific application of FIG. 7 and subsequent FIGS. to the PES A area of wedge 300', and n may have another value (e.g., "b") for specific application of FIG. 7 and subsequent FIGS. to the PES B area of wedge 300'. Because the written angle of CF 310 is assumed to be 0 in this particular illustrative embodiment, the relationship shown in FIG. 8 applies. ("Written angle" in the immediately preceding sentence refers to the "calibration field phase offset" parameter in FIG. 5, and the statement that "the written angle of CF 310 is assumed to be 0" means that as a simplification for the particular embodiment being described, CF 310 is recorded so that it always begins at 0° in a calibration field cycle, as that term is defined earlier in this specification.) The idea then is to construct the values represented by the expression shown in FIG. 9.

Again, because the immediately above-mentioned written angle of CF 310 is always 0, the sampling phase error (or sampling phase offset) δ can be removed from S0 for each short null servo PES wedge PES A and PES B field as shown in FIG. 10. For example, if sampling phase error δ is causing $S0_a$ as actually measured and computed for the PES A area of short null servo PES wedge 300' to be erroneously reduced, that error can be eliminated from the value $ReX_a$ that is actually used by the head position control element (e.g., element 490 in FIG. 16) of the disk storage system by multiplying the measured and computed value of $S0_a$ by the scale factor or correction factor shown in the last line of FIG. 10 (i.e., the value of $M_{cf}$ as measured and computed per FIG. 6) divided by the value of $S0_{cf}$ as also measured and computed per FIG. 6). Note that $S0_a$ in the immediately preceding sentence is measured and computed similarly to what is shown in the second line of FIG. 6, but with the subscript cf in that line effectively changed to subscript a because for purposes of determining $S0_a$ the read head 10 output signal during reading of the short servo wedge PES A area is being sampled and processed analogous to what is shown in the second line of FIG. 6. Similarly, if sampling phase error δ is causing $S0_b$ as actually measured and computed for the PES B area of short null servo PES wedge 300' to be erroneously reduced, that error can be eliminated from the value $ReX_b$ that is actually being used by the head position control element (e.g., 490) of the disk storage system by multiplying the measured and computed value of $S0_b$ by the scale factor or correction factor $M_{cf}/S0_{cf}$ as shown in the last line of FIG. 10. Note again that $S0_b$ in the immediately preceding sentence is measured and computed similarly to what is shown in the second line in FIG. 6, but with the subscript cf in that line changed to subscript b because for purposes of determining $S0_b$ the read head 10 output signal during reading of the short servo wedge PES B area is being sampled and processed analogous to what is shown in the second line of FIG. 6.

From the foregoing, it will be seen that the values of $ReX_a$ and $ReX_b$ mentioned in the immediately preceding paragraph are "corrected" as compared to the corresponding measured and computed $S0_a$ and $S0_b$ values. This correction gets rid of (eliminates, reverses) the adverse effect of any possible sampling phase error δ in the sampling of the read head 10 output signal during reading of the short wedge 300' PES A and PES B areas. The appropriate correction factor ($M_{cf}/S0_{cf}$ in the last line of FIG. 10) is determined based on reading the CF 310 of the short wedge 300'. This typically occurs just prior to reading the PES A area and then the PES B area of that same short wedge 300'. Because the head position control element (e.g., 490 in FIG. 16) operates on the corrected $ReX_a$ and $ReX_b$ values, the head position control element (e.g., 490) can more accurately reposition read head 10 radially of disk 20 for continued reading of the desired disk track after short null servo PES wedge 300' has been read. Such read head 10 repositioning is more accurate and reliable than it would be if the adverse effects of possible sampling phase error δ were not eliminated as described above in accordance with this disclosure.

Certain simplifications of the above calculation of the PES field 150' ReX terms are possible as will now be explained. Refer again to the last two lines of FIG. 10. Based on the properties inherent in a null servo (i.e., a servo including PES A and PES B areas as shown at 150' in FIGS. 3 and 4), it is known that $M_{cf}$ and $M_n$ are all positive numbers, and that $\cos(A_n)$ is either +1 or -1. This means that the series of statements shown in FIG. 11 can be used. $M_n$ can be computed from $S0_n$ and $S1_n$ (e.g., as in the next-to-last line of FIG. 6, with subscript cf changed to subscript n). The series of statements shown in FIG. 12 can then be used to apply the logic of FIG. 11 to the determination of values for $ReX_n$ from the respective values of $M_n$.

The determination shown in FIG. 12 may become unreliable when $S0_{cf}$ is close or equal to 0. It may then become less certain whether the term $S0_n/S0_{cf}$ is a positive or negative number. To address this possible issue, it is known that the CF 310 always has a substantial magnitude. This means that when $S0_{cf}$ is closer to 0, the majority of the magnitude is in $S1_{cf}$. With this knowledge, a determination like that shown in FIG. 12 can be selectively rotated by 90 degrees to avoid any condition of possible uncertainty. This selective rotation is implemented in the series of statements shown in FIG. 13. The operator "abs" in FIG. 13 yields the absolute value of the variable inside the immediately following parentheses.

The following relates to generalization of the PES field ReX term calculation for a short null servo PES wedge 300' in accordance with certain possible aspects of this disclosure. In a short null servo PES wedge like 300', CF 310, PES A, and PES B can be detected in magnitude/angle mode. The ReX term of each PES A and PES B area can be calculated as shown in FIG. 14. In FIG. 14, etc., $CA_n$ refers to the calculated angle for the PES A (n=a) or PES B (n=b) areas of wedge 300'; and m refers to the number of samples taken per cycle of the PES A or PES B area of interest in wedge 300' (where again the term "cycle" has the same general meaning as in the case of a "cycle" of CF 310'). The user can use the two $ReX_n$ terms to determine the read head 10 radial position error in the same way that the position error signal is determined from a full null servo PES wedge (e.g., like 110 in FIG. 1 or FIG. 3).

Figure 15:
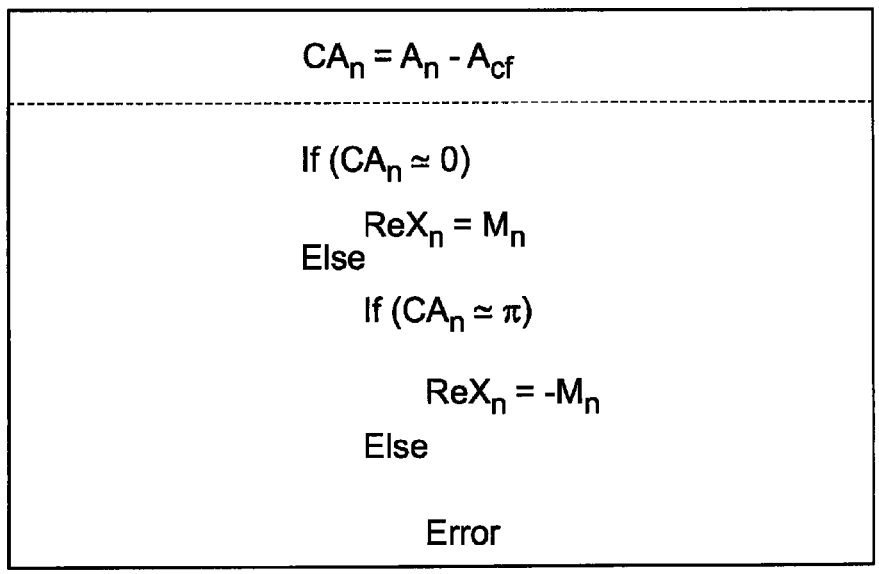

The immediately preceding analysis can be simplified when $m_{cf}$=m. The resulting simplification of what is shown in FIG. 14 is shown in FIG. 15. However, use of the FIG. 13 technique may be preferred.

Figure 16:
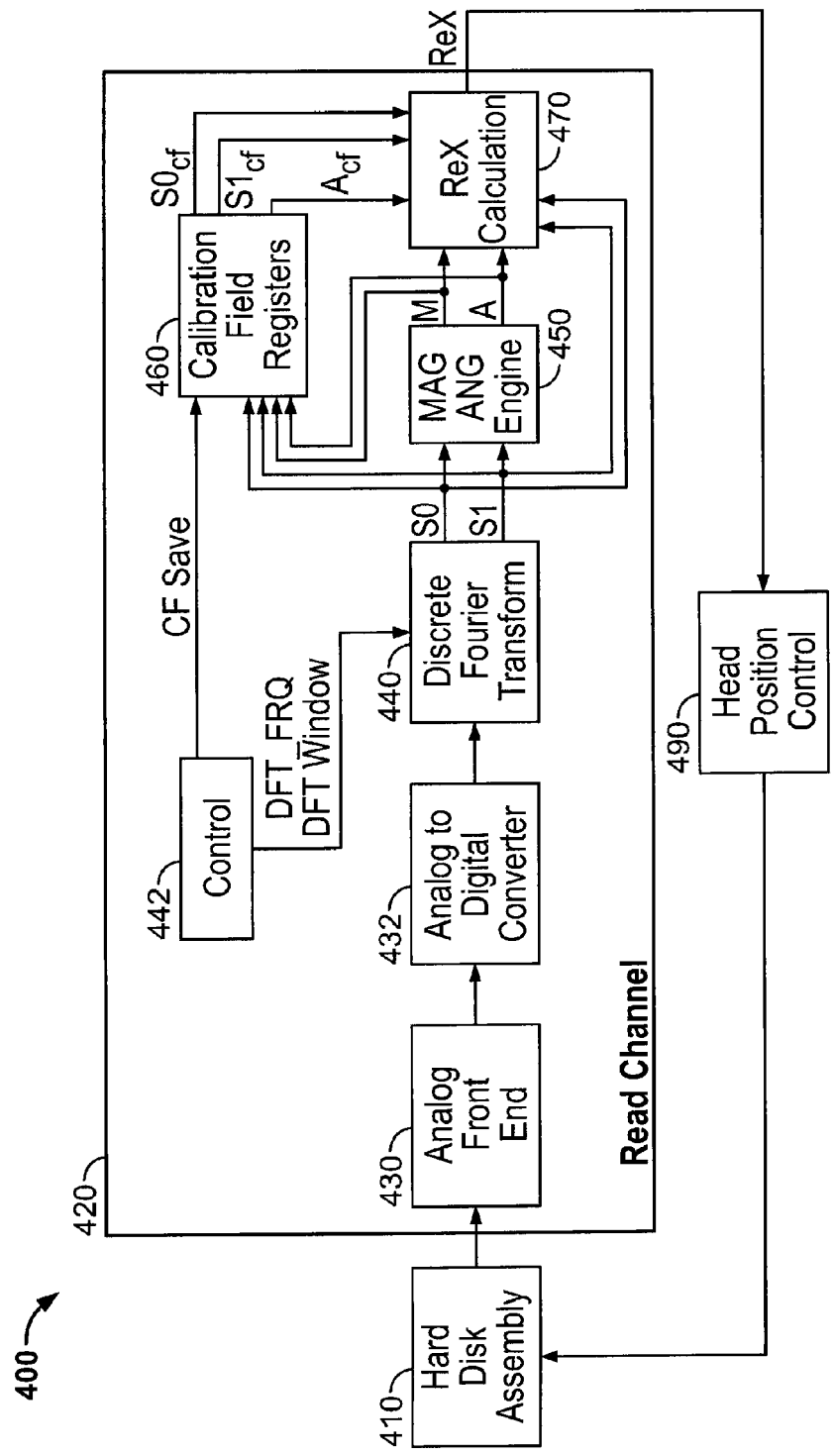
FIG. 16 is a simplified block diagram of an illustrative embodiment of circuitry that can be used to process information read from a recorded information arrangement like that shown in FIGS. 3 and 4.

An illustrative embodiment of disk storage system apparatus (including circuitry) 400 for responding to short null servo PES wedges 300' in accordance with certain possible aspects of this disclosure is shown in FIG. 16. Apparatus 400 includes hard disk assembly 410, read channel circuitry 420, and head position control 490. The output signal of read head 10 in hard disk assembly 410 (which, per se, can be conventional, and which contains disk 20' as well as including read head 10) is applied to analog front end circuitry 430 (which, per se, can also be conventional). Analog to digital converter circuitry 432 (which, per se, can also be conventional) converts the analog output signal of circuitry 430 to a digital signal. Thus circuitry 432 performs the above-mentioned sampling of the read head 10 output signal.

Discrete Fourier transform ("DFT") circuitry 440 (which, per se, can be a known type of circuitry) processes the samples x[i] output by circuitry 432, e.g., by performing on those samples x[i] operations like those shown in the first two lines of FIG. 6 to produce values of S0 and S1 for each of the calibration field 310 and the PES A and PES B areas 150' of any short null servo PES wedge 300' encountered on the disk 20' being read. Control circuitry 442 helps to control operation of DFT circuitry 440 (e.g., by providing signals indicative of the sampling frequency ("DFT_FRQ") and the time window(s) ("DFT WINDOW") within which various sample sets are to be considered for processing).

The S0 and S1 output signals of DFT 440 are applied to magnitude ("MAG") and angle ("ANG") engine circuitry 450, and also to calibration field registers 460 and ReX calculation circuitry 470. Control circuitry 442 may also produce a "CF SAVE" output signal (e.g., when the window for DFT 440 to operate on samples associated with a CF 310 has just closed) for enabling registers 460 to store the final S0 and S1 values associated with a CF 310 that has just been read.

MAG/ANG engine circuitry 450 is used to calculate the magnitude and angle of the read head 10 output signal for each of CF 310, PES A, and PES B based on the relationships shown in FIG. 17 (which are generalized from the last two lines of FIG. 6). To simplify the circuitry required for computation of the trigonometric a tan 2 function, a digital computation technique such as the (known per se) CORDIC technique may be used. ("CORDIC" is a known acronym for Coordinate Rotation Digital Computer.) At least some known CORDIC techniques generate both M (magnitude) and A (angle) terms, and therefore use of such a technique means that there is no additional cost in terms of circuit requirements to determine the angle term in addition to the magnitude term. The M and A output signals of MAG/ANG engine circuitry 450 are applied to registers 460, and also to ReX calculation circuitry 470. As in the case of the S0 and S1 signals output by DFT 440 at the end of processing a CF 310, registers 460 may store the M and A signals (values) output by MAG/ANG engine 450 at the end of processing that CF 310. (In fact, $M_{cf}$ may not be needed and may therefore not be stored in registers 460.)

In addition to receiving the M and A output signals of MAG/ANG engine 450, ReX calculation circuitry 470 can receive the $S0_{cf}$, $S1_{cf}$, and $A_{cf}$ signals (values) stored in registers 460 for the CF 310 of the short null servo PES wedge 300' currently being read. Circuitry may also receive the $S0_n$ and $S1_n$ output signals of DFT circuitry 440. Circuitry 470 can operate in accordance with what is shown in any of FIGS. 12-15 to calculate the two $ReX_n$ values that need to be applied to head position control element 490 to enable element 490 to determine the amount and direction of any needed change in the radial position of read head 10 in hard disk assembly 410 and to cause such read head 10 position change to occur. (Although the preceding sentence mentions two $ReX_n$ values, there could be more than two $ReX_n$ values if, for example, short null servo PES wedge 300' includes more PES areas than the PES A and PES B areas shown in FIGS. like FIG. 3 and FIG. 4.) Element 490 can be per se conventional. It will be apparent from the foregoing discussion that the $ReX_n$ values output by ReX calculation circuitry 470 are values that have been determined in such a way as to eliminate the adverse effects of any possible sampling phase error δ. This is true regardless of which of the, e.g., FIGS. 12-15 techniques (or the later-described FIG. 19 technique) is used to produce the ReX values. Conventional head position control element 490 can therefore use these two $ReX_n$ values in the same way that element 490 can use ReX values output by other conventional circuitry used for conventional processing of signal information read from a conventional full null servo PES wedge 110. Based on these ReX values, element 490 (which, per se, can be a conventional type of element) causes hard disk assembly 410 to make any adjustment to the radial position of read head 10 that is necessary to center the read head over the disk 20' track currently being read.

Various simplifications can be employed in the operations performed to calculate ReX in a system like that shown in FIG. 16. For example, the calibration waveform can be written on the disk so that $\phi_{cf}$ is 0. This possible simplification has already been referred to in some of the discussion above.

Another possible simplification relates to $m/m_{cf}$ division. Because the final angle $CA_n$ is only needed in approximate form, the system does not require a precise ratio between the PES 150' period and the CF 310 period. Also, phase jitter of either PES area is given by the product of frequency error times distance between the CF 310 and that PES area. This number should be very small. As long as the multiplication error (due to simplification of the $m/m_{cf}$ ratio) plus the phase jitter is less than π/2, the total error will not adversely affect the ReX calculation. Thus the multiplication factor can be simplified with the equation shown in FIG. 18. (Note that the variables m and n in FIG. 18 are unrelated to the variables referred to by the letters m and n elsewhere in this disclosure.) Examples of values that $C_{cf}$ may have are 0.75, 0.625, 0.5625, 0.5, 0.4375, 0.375, 0.3125, 0.25. Also note that the Mod 2π function is naturally an overflow function of an integer number.

Employing the foregoing simplifications, a phase approximation can be implemented as a phase slicer at π/2 and −π/2 as shown in FIG. 19 (which is the resulting further simplification of what is shown below the dotted line in FIG. 14, and which can be how the FIG. 16 system actually determines ReX).

Characterizing certain aspects of what is shown in FIG. 16 in somewhat different terms, circuitry 420 comprises circuitry for using a signal ("the calibration field signal") indicative of information read from disk 20' by read head 10 passing over calibration field 310 (all in hard disk assembly 410) as a basis for processing a signal ("the position error field signal") indicative of information read from disk 20' by read head 10 passing over position error signal field 150'.

Circuitry 420 may be further characterized as comprising first further circuitry (e.g., elements 430, 432, 440, 442, 450, and 460) for determining a calibration field signal magnitude $M_{cf}$ (and/or constituents $S0_{cf}$ and $S1_{cf}$ thereof) and a calibration field signal angle $A_{cf}$ (and/or constituents $S0_{cf}$ and $S1_{cf}$ thereof) from the calibration field signal, and position error field signal magnitudes $M_n$ (and/or constituents $S0_n$ and $S1_n$ thereof) and position error field signal angles $A_n$ (and/or constituents $S0_n$ and $S1_n$ thereof) from the position error field signal.

Circuitry 420 may be still, further characterized as further comprising second further circuitry (e.g., element 470) for selectively modifying the position error field signal magnitudes $M_n$ based at least in part on the calibration field signal angle $A_{cf}$ to produce signals $ReX_n$ for use in controlling adjustment of a radial position of read head 10 relative to disk 20'.

The immediately above-mentioned second further circuitry (e.g., element 470) may use the calibration field signal angle $A_{cf}$ to determine an algebraic sign for the position error field signal magnitudes and to thereby produce signed magnitude signals (e.g., $M_n$ or $-M_n$ in any of FIG. 12-15 or 19). The signals $ReX_n$ for use in controlling adjustment of the radial position of read head 10 may be based at least in part on the just-mentioned signed magnitude signal (e.g., as in any of FIG. 12-15 or 19). The technique shown in FIG. 13 may be especially desirable; but again, the techniques shown in any of FIGS. 12-15 and 19 can be used.

A calibration field ("CF") 310 as shown herein can also have other uses. To support such other uses it may be desirable to allow CF 310 to have a different frequency than other fields such as the associated PES A and PES B area 150'.

An example of a possible additional use for CF 310 is for flying height detection (i.e., detection of the distance that read head 10 is travelling above the surface of the disk 20' it is reading). Flying height detection normally employs a DFT technique for such detection. For example, this technique may involve analysis of (1) the fundamental frequency of the read head 10 output signal, and (2) a harmonic of the fundamental frequency (e.g., the third harmonic). The PES field 150' frequency is preferably selected to minimize the third harmonic frequency. Allowing CF 310 to have a frequency different from the PES field 150' frequency enables the user to use a pattern in short null servo PES wedge 300' that is more appropriate for flying height detection. The possible consequence of imprecise detection of phase/magnitude for CF 310 does not affect the precision of PES 150' detection.

Another possible use of CF 310 is for frequency offset detection. If short null servo PES wedge 300' is written synchronously with the previous full null servo PES wedge 110, any sampling phase offset is an accumulation of frequency error multiplied by the distance between the full null servo PES wedge 110 and the short null servo PES wedge 300'. A CF 310 of $m_{cf}$ samples per cycle allows measurement of accumulated phase error up to $+/-m_{cf}/2$ samples. Higher $m_{cf}$ (resulting from, for example, a lower frequency of magnetic polarity reversal in CF 310) allows greater measurement range.

Figure 20:
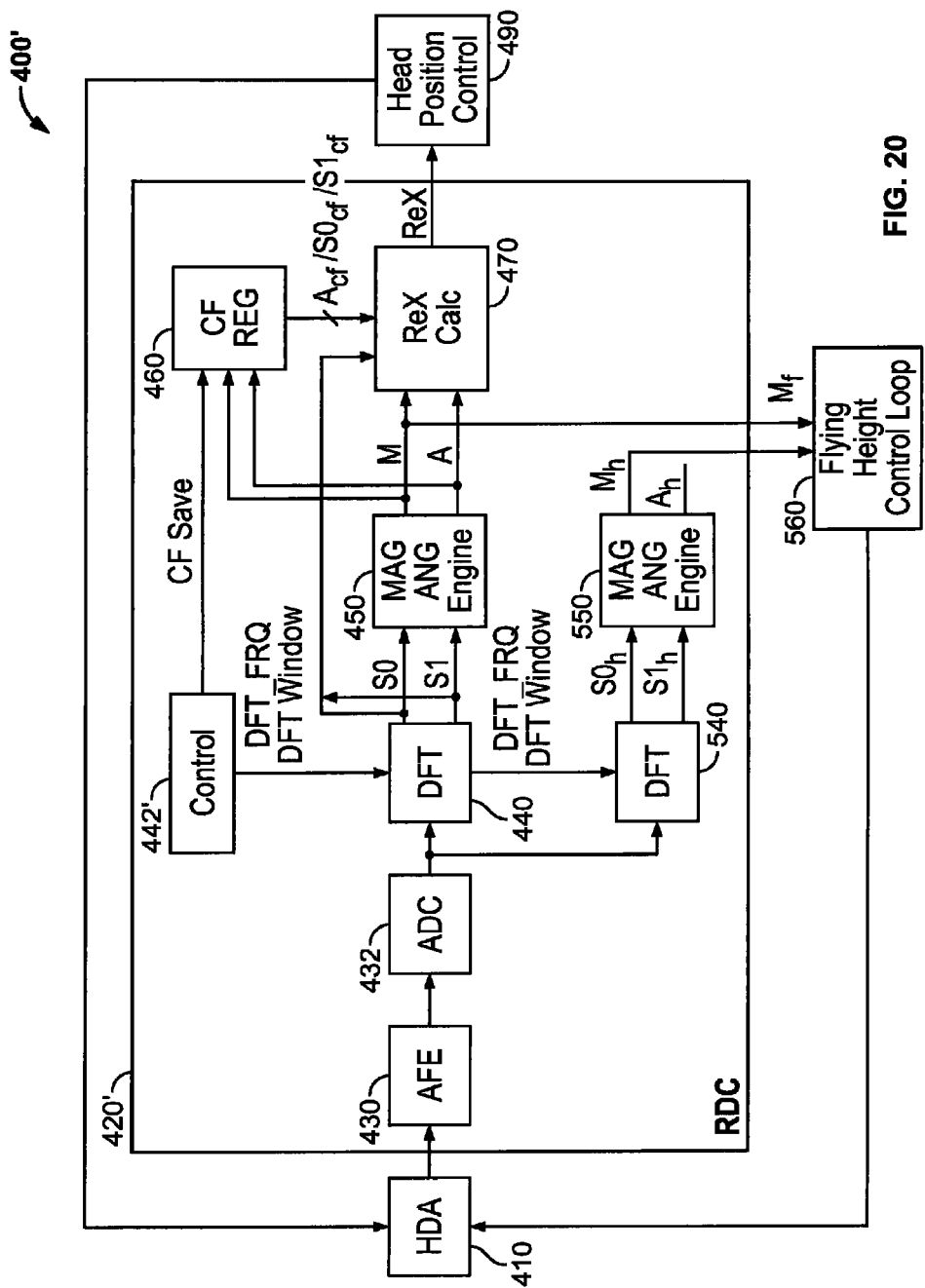
FIG. 20 is similar to FIG. 16, but shows an alternative embodiment with additional capabilities in accordance with certain possible aspects of the disclosure.

FIG. 20 shows an illustrative embodiment of disk storage system apparatus 400' in accordance with certain possible aspects of this disclosure that is modified from what is shown in FIG. 16 to also provide flying height control based at least in part on information recorded in CF 310 as mentioned above. Elements in FIG. 20 that are the same as elements in FIG. 16 have the same reference numbers in both FIGS. Elements in FIG. 20 that are somewhat modified from FIG. 16 elements have the FIG. 16 reference with a prime symbol in FIG. 20. Elements in FIG. 20 that have no counterparts in FIG. 16 have reference numbers in the 500 range in FIG. 20. Because FIG. 20 is somewhat more crowded than FIG. 16, certain element names are somewhat abbreviated in FIG. 20. The meaning of each such abbreviation can be determined by looking at the corresponding full element name in FIG. 16. Because much of what is shown in FIG. 20 has already been fully described in connection with FIG. 16, the description of FIG. 20 can be somewhat abbreviated in what now immediately follows.

The first DFT 440 and MAG ANG engine 450 in FIG. 20 are used to detect the fundamental frequency of a calibration field ("CF") 310. These elements also operate as described earlier on the PES field 150' associated with that CF 310. The second DFT 540 and MAG ANG engine 550 are used to detect a harmonic frequency over the CF 310. The fundamental frequency magnitude $M_f$ and harmonic frequency magnitude $M_h$ of the calibration field 310 are fed to flying height control loop circuitry 560, which produces an output signal for use by hard disk assembly 410 as at least part of the control for the flying height of the read head 10 in hard disk assembly 410.

Figure 21:
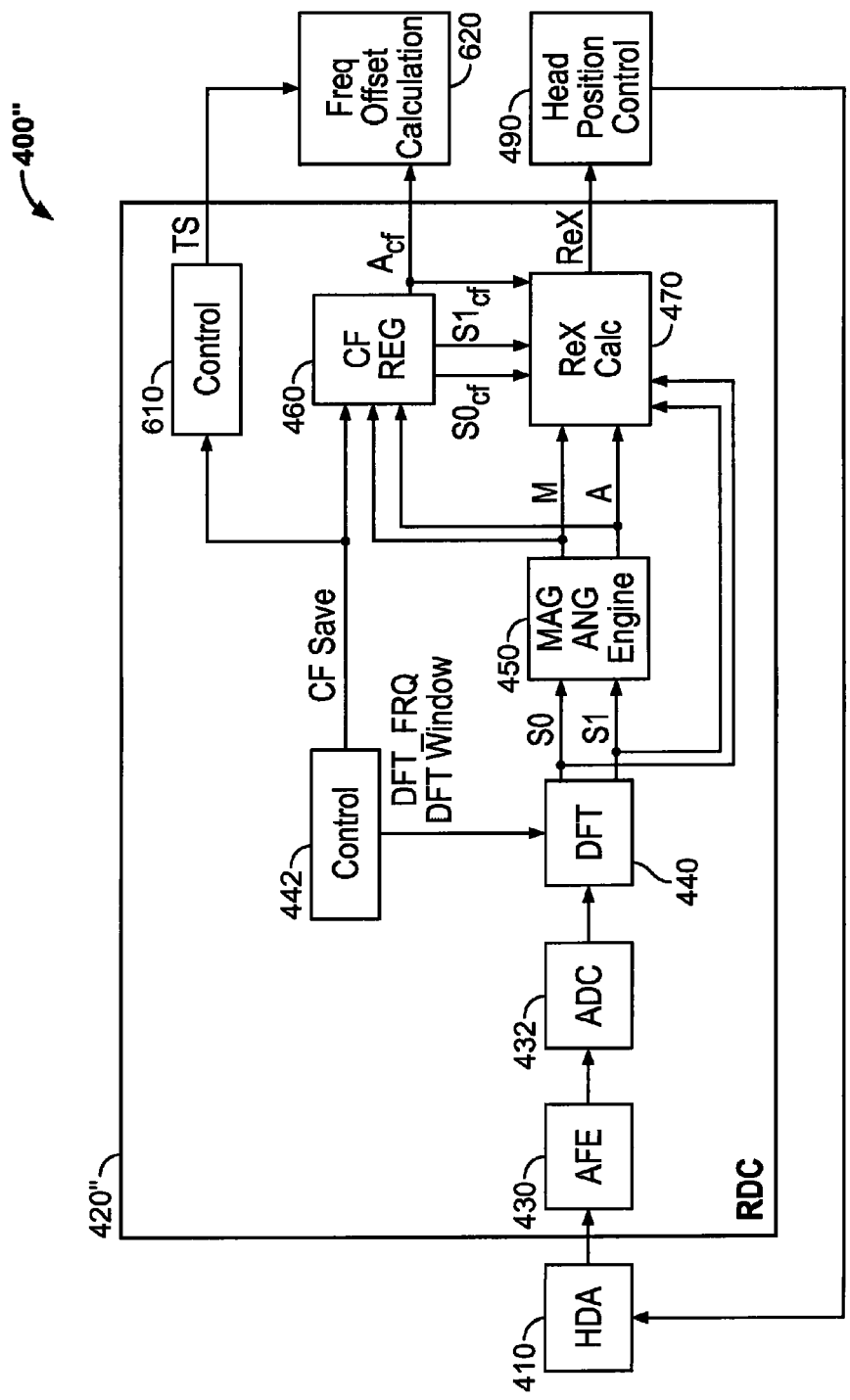
FIG. 21 is again similar to FIG. 16, but shows another alternative embodiment with additional capabilities in accordance with certain possible aspects of the disclosure.

FIG. 21 shows an illustrative embodiment of disk storage system apparatus 400" in accordance with certain possible aspects of this disclosure that is modified from what is shown in FIG. 16 to also provide frequency offset error calculation based in part on information recorded in CF 310 as mentioned above. Elements in FIG. 21 that are the same as elements in FIG. 16 have the same reference numbers in both FIGS. Elements in FIG. 21 that are somewhat modified from FIG. 16 elements have the FIG. 16 reference number with a double prime symbol in FIG. 21. Elements in FIG. 21 that have no counterparts in FIG. 16 have reference numbers in the 600 range in FIG. 21. Certain element names in FIG. 21 are abbreviated in the same way that they are abbreviated in FIG. 20. Because much of what is shown in FIG. 21 has already been fully described in connection with FIG. 16, the description of FIG. 21 is somewhat abbreviated in what immediately follows.

In FIG. 21 the angle $A_{cf}$ of calibration field ("CF") 310 is used to calculate the frequency offset error. In addition to $A_{cf}$ (produced as described earlier (e.g., in connection with FIG. 16)), a time stamp ("TS") signal is generated by control circuitry 610 with a fixed relationship to the calibration field 310 detection window, as signalled, for example, by the CF SAVE signal. Both the TS signal and the $A_{cf}$ signal are sent to frequency offset calculation circuitry 620, which can calculate the frequency offset error based at least in part on these two input signals. For example, the TS signal can be generated based on when the preceding full null servo PES wedge 110 was detected on the disk. Based on that information, the intended speed of rotation of disk 20', and the known angular distance between the full null servo PES wedge 110 and the short null servo PES wedge 300', the TS signal can provide an indication as to when CF 310 should be detected. Thus the TS signal may be referred to as a signal for indicating the expected angular position of CF 310. $A_{cf}$, on the other hand, can be used (in this context) as a signal for indicating the actual, measured, or detected angular position of CF 310. The difference between these two signals is an indication of frequency offset error in disk memory system 400". Such frequency offset error may be due, for example, to disk rotation speed error, error in the frequency of any of various clock signals in the system, etc.

It will be understood that the foregoing is only illustrative of the principles of this disclosure, and that various modifications can be made by those skilled in the art without departing from the scope or spirit of the disclosure. For example, both of the modifications shown in FIGS. 20 and 21 can be combined in one embodiment if desired. As another example, references herein to "first magnetic polarity" or the like can generally mean either "positive magnetic polarity" or "negative magnetic polarity." Whichever one of "positive" or "negative" is chosen for the "first magnetic polarity," then the other one of "positive" or "negative" will be the "second magnetic polarity" or the like.

What is claimed is:

1. A disk drive controller comprising:
   circuitry that detects at least one full null servo position error signal ("PES") wedge on a memory disk; and
   circuitry that reads at least one short null servo PES wedge on the memory disk, to detect a calibration field and a position error signal field; wherein:
   the calibration field comprises a plurality of bands, each band having magnetic polarization that is opposite to magnetic polarization of others of said bands that are immediately adjacent to said each band.

2. The disk drive controller defined in claim 1 wherein the full null servo PES wedge comprises track/sector identification ("ID") data, and wherein the short null servo PES wedge does not include track/sector ID data.

3. The disk drive controller defined in claim 2 wherein the circuitry that reads detects the calibration field before the position error signal field as the memory disk rotates past a read head.

4. The memory disk defined in claim 2 wherein the memory disk includes a plurality of concentric information tracks, and wherein the circuitry that reads reads from first and second position error signal ("PES") areas, the first PES area having a plurality of first subareas, each of which is aligned with a respective one of the tracks, and the second PES area having a plurality of second subareas, each of which is not aligned with the tracks.

5. The disk drive controller defined in claim 4 wherein the circuitry that reads produces an output signal, when reading from only a particular first subarea, having a phase that is 180 degrees different from phase of an output signal produced when the circuitry that reads reads from only either of the first subareas that are radially adjacent to said particular first subarea.

6. The disk drive controller defined in claim 4 wherein the circuitry that reads produces an output signal, when reading from only a particular second subarea, having a phase that is 180 degrees different from phase of an output signal produced when the circuitry that reads reads from only either of the second subareas that are radially adjacent to said particular second subarea.

7. The disk drive controller defined in claim 1 wherein the calibration field has a frequency different than the position error signal field.

8. The disk drive controller defined in claim 1 wherein the calibration field has a known phase relationship to the full null servo PES wedge.

9. A disk drive controller system that reads information from a disk that is rotating relative to a read head, the information being previously recorded in a plurality of tracks, the disk having at least one full null servo position error signal ("PES") wedge recorded on the disk, and at least one short null servo PES wedge recorded on the disk at a location that is angularly spaced from the full null servo PES wedge, the short null servo PES wedge including a calibration field and a position error signal field, the disk drive controller system comprising:

circuitry that reads the calibration field to produce a calibration field signal;

circuitry that reads the position error signal field to produce a position error field signal; and control circuitry that uses information from the calibration field signal and the position error field signal to produce a signal for use in controlling a radial position of the read head relative to the disk; wherein:

the information from the position error field signal is indicative of an amount by which the read head is radially displaced from the center of a track being read; and the control circuitry adjusts the information from the position error field signal based at least in part on information from the calibration field signal to compensate for phase error in the position error field signal.

10. The disk drive controller system defined in claim 9 wherein the control circuitry further comprises:

circuitry that periodically samples each of the calibration field signal and the position error field signal to produce respective sets of calibration field signal samples and position error field signal samples; and circuitry that performs a discrete Fourier transform on each of the sets of samples.

11. The disk drive controller system defined in claim 10 wherein the control circuitry further comprises:

circuitry that converts results of each discrete Fourier transform to a magnitude value and an angle value.

12. The disk drive controller system defined in claim 11 wherein the control circuitry further comprises:

circuitry that combines an angle value from the discrete Fourier transform of a set of samples of the calibration field signal and an angle value from the discrete Fourier transform of a set of samples of the position error field signal to produce a calculated angle value.

13. The disk drive controller system defined in claim 12 wherein the control circuitry further comprises:

circuitry that uses the calculated angle value to determine an algebraic sign for a magnitude value from the discrete Fourier transform of a set of samples of the position error field signal.

14. The disk drive controller system defined in claim 9 wherein the calibration field has a frequency different than the position error signal field, the disk drive controller system further comprising:

circuitry that controls flying height of the read head relative to the disk based at least in part on information read from the calibration field.

15. The disk drive controller system defined in claim 9 wherein the short null servo PES wedge is recorded at a predetermined angular spacing from the full null servo PES wedge, the disk drive controller system further comprising:

circuitry that determines an expected angular position of the calibration field based at least in part on the full null servo PES wedge;

circuitry that detects an actual angular position of the calibration field; and circuitry that uses the expected angular position and the actual angular position to determine a frequency offset error.

16. A method of controlling a disk drive in which information is read from a disk that is rotating relative to a read head, the information being previously recorded in a plurality of tracks, the disk having at least one full null servo position error signal ("PES") wedge recorded on the disk, and at least one short null servo PES wedge recorded on the disk at a location that is angularly spaced from the full null servo PES wedge, the short null servo PES wedge including a calibration field and a position error signal field, the method comprising:

reading the calibration field to produce a calibration field signal;

reading the position error signal field to produce a position error field signal; and using information from the calibration field signal and the position error field signal to produce a signal for use in controlling a radial position of the read head relative to the disk; wherein:

the information from the position error field signal is indicative of an amount by which the read head is radially displaced from the center of a track being read; and the using comprises adjusting the information from the position error field signal based at least in part on information from the calibration field signal to compensate for phase error in the position error field signal.

17. The method defined in claim 16 wherein the using further comprises:

periodically sampling each of the calibration field signal and the position error field signal to produce respective sets of calibration field signal samples and position error field signal samples;

performing a discrete Fourier transform on each of the sets of samples;

converting results of each discrete Fourier transform to a magnitude value and an angle value; and combining an angle value from the discrete Fourier transform of a set of samples of the calibration field signal and an angle value from the discrete Fourier transform of a set of samples of the position error field signal to produce a calculated angle value.

18. The method defined in claim 17 wherein the using further comprises:

using the calculated angle value to determine an algebraic sign for a magnitude value from the discrete Fourier transform of a set of samples of the position error field signal.

19. The method defined in claim 16 wherein the calibration field has a frequency different than the position error signal field, the method further comprising:

controlling flying height of the read head relative to the disk based at least in part on information read from the calibration field.

20. The method defined in claim 16 wherein the short null servo PES wedge is recorded at a predetermined angular spacing from the full null servo PES wedge, the method further comprising:

determining an expected angular position of the calibration field based at least in part on the full null servo PES wedge;

detecting an actual angular position of the calibration field; and using the expected angular position and the actual angular position to determine a frequency offset error.

* * * * *